March 17, 1925. 1,530,240
A. E. B. CRAWFORD
MEANS, SUCH AS LENSES, FOR SPECTACLES AND EYEGLASSES
FOR ASSISTING OR CORRECTING DEFECTIVE VISION
Filed Nov. 27, 1923
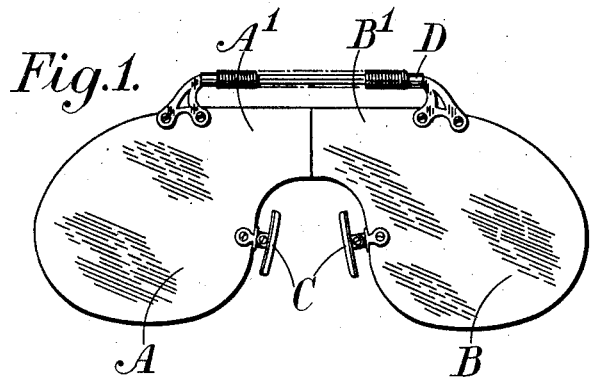
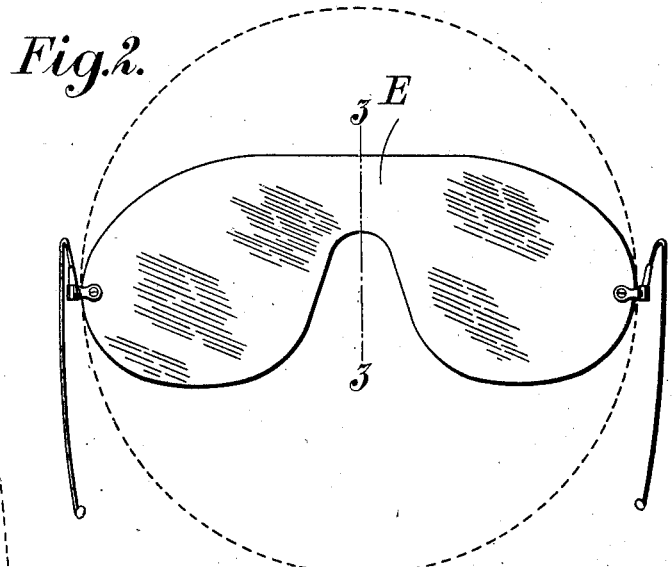
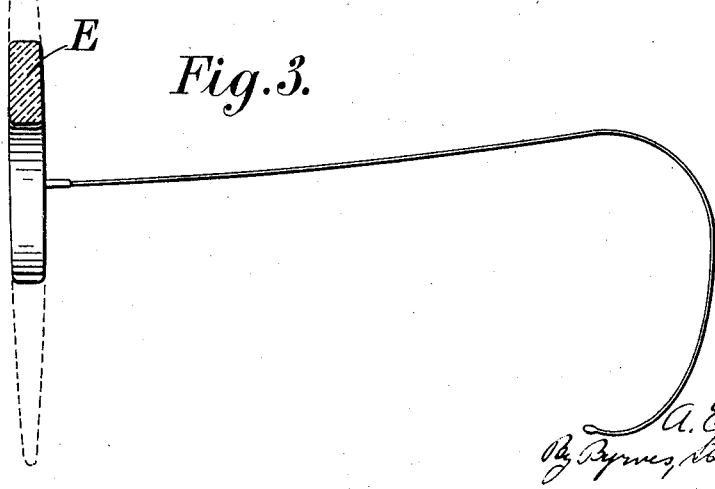
INVENTOR Patented Mar. 17, 1925.

1,530,240

UNITED STATES PATENT OFFICE.

ALBERT EDWARD BREDIN CRAWFORD, OF TISBURY, NEAR SALISBURY, ENGLAND.

MEANS, SUCH AS LENSES, FOR SPECTACLES AND EYEGLASSES FOR ASSISTING OR CORRECTING DEFECTIVE VISION.

Application filed November 27, 1923. Serial No. 677,239.

*To all whom it may concern:*

Be it known that I, ALBERT EDWARD BREDIN CRAWFORD, British subject, residing at Tisbury, near Salisbury, Wiltshire, England, have invented certain new and useful Improvements in Means, Such as Lenses, for Spectacles and Eyeglasses for Assisting or Correcting Defective Vision, of which the following is a specification.

This invention relates to means, such as lenses for spectacles and eye-glasses, for assisting or correcting the defective vision of both eyes. Spectacles and eye-glasses as usually constructed at the present day with a metal or other opaque bridge-piece between the lenses have the defect that when they are in use the field of assisted or corrected vision is limited at both sides of the face and at the bridge of the nose by the edges of the lenses; when an object to be viewed is situated so much to one side of the observer that the line of sight passes between the edge of one lens and the bridge of the nose, it is necessary to turn the head in order to view it through the glasses. In other words, the wearer of such spectacles or eye-glasses cannot, so to say, look out of the corners of his eyes and still have the benefit of corrected vision. Thus the universal-joint action of the eyes is greatly restricted as compared with unassisted vision, and the wearers of such glasses tend to move the head in a bird-like manner when viewing objects situated not directly in front of them. This in turn gives the muscles of the eyes less work to do, so that they tend to become atrophied.

One object of this invention is to obviate these defects and to enable the wearer of glasses to move his eyes in the natural manner from side to side through a greater angle than was possible heretofore and still obtain the benefits of assisted or corrected vision.

It has heretofore been proposed to use one piece of glass in motor goggles extending across both eyes for protective purposes, but the single glass was plain and was not intended to assist or correct defective vision, whereas an important object of this invention is to increase the extent of the field of assisted or corrected vision as compared with that provided by eye-glasses or spectacles of the construction usual at the present day.

According to this invention therefore, there is provided means for assisting or correcting the defective vision of both eyes, comprising two ocular portions spaced apart, one portion for each eye, like the lenses of eye-glasses or spectacles, characterized in that the ocular portions are formed respectively with a lug-like extension so shaped and juxtaposed as to constitute a glass bridge-piece which itself forms an optical continuation of the ocular portions and operates to assist the vision when the line of sight from one eye passes through the lug-like extension of the ocular portion in front of that eye.

Conveniently, the two ocular portions and their extensions forming the bridge-piece constitute a single glass, which may be cut out of a single lens.

The optical centre of each ocular portion and its lug-like extension may be situated substantially midway between the middle of the bridge-piece and the opposite end of the ocular portion, for extending the field of assisted vision an equal or approximately equal distance on both sides of the optical centres of each lens.

Each ocular portion and its extension may be cut out of a single lens having appropriate optical properties, which lenses are each of a diameter greater than the width across both eyes, in order to assist or correct defective vision due to different defects of the two eyes.

The invention is illustrated by way of example by the accompanying drawing, wherein—

Figure 1 is a vertical elevation showing one form of eye-glasses or pince-nez according to the invention, Figure 2 is a front elevation of "spectacles" made according to the invention, and Figure 3 is a vertical section taken on the line 3—3 Figure 2.

Referring first to Figure 1, the eye-glasses or pince-nez comprise two ocular portions A, B constituting lenses having their optical centres spaced apart, one lens for each eye, and provided each with a plaquet C of any convenient construction. The lenses A, B, are formed each with a lug-like extension $A^1$, $B^1$, respectively directed towards one another and together constituting a glass bridge-piece, the two ocular portions A, B being mounted in a manner known in itself on a bar D so that they can be slid away from one another against the action of a spring and towards one another in the general plane containing them. The adjacent end faces of the lug-like extension A¹, B¹ can abut one against the other in a plane that extends through the middle of the bridge at right angles to the length of the glasses.

The lug-like extensions are so shaped, preferably by grinding, as to constitute each an optical continuation to its allotted ocular portion. Thus each extension will operate to assist or correct defective vision of an eye, whereby the defects referred to above will be minimized or obviated.

Preferably each ocular portion extends a distance from its optical centre away from the bridge-piece equal to the distance between that centre and the junction of the two extensions. In other words, the optical centre of each ocular portion and its lug-like extension is situated substantially midway between the middle of the bridge-piece and the opposite end of the ocular portion. In this manner the field of assisted or corrected vision is extended not only towards the nose, but also away from it as compared with that afforded by eye-glasses and spectacles of usual construction at the present day.

Each ocular portion and its extension may of course be shaped differently for different assistance or correction of the separate eyes.

Instead of making the ocular portions separately, they may be integral with one another and constitute with their lug-like extensions a single glass E, of "spectacles" as shown in Figures 2 and 3. As indicated by a circular broken line this glass E may be cut out of a single lens having a diameter of the dotted circle, which diameter is greater than the width across both eyes. The single glass has a contour generally resembling a pair of eye-glasses, but comprises a glass bridge-portion situated between two ocular portions constituted by parts of said lens lying symmetrically on opposite sides of the optical axis of the lens. Sides or temples F, such as are used in spectacles, may be pivotally attached to the ends of the single glass E in any convenient manner. Pince-nez having a single glass may be made in the same manner. In this case plaquets will be used which do not necessitate pulling the ocular portions apart in order to grip the nose. In this construction the optical axis of each ocular portion will not necessarily lie along the line of normal vision. Each ocular portion of the single glass and its lug may however, be ground if desired after the single glass has been cut, such grinding extending to the middle of the bridge, if desired.

When the ocular portions are made separately each with its lug-like extension, each ocular portion and its lug may be cut from a single lens, the two lenses from which they are cut having each a diameter greater than the width across both eyes, and preferably being of different refractive powers, for assisting or correcting defective vision due to different defects of the two eyes. Alternatively, the two ocular portions and their lugs may be cut each from different parts of the same lens of a diameter greater than the width across both eyes, in which case they will be subsequently ground differently for correcting or assisting defective vision of separate eyes of different strength.

What I claim as my invention and desire to secure by Letters Patent is:

1. Means for assisting defective vision of both eyes, comprising two ocular portions spaced apart, one portion for each eye, like the lenses of eye-glasses or spectacles, which ocular portions are formed each with a lug-like extension so shaped and juxtaposed as to constitute an unobstructed glass bridge-piece which itself forms an optical continuation of the said ocular portions and which extensions extend each to a central line that lies at right angles to the longitudinal axis of the bridge-piece and bisects the latter, substantially as described.

2. Means for assisting defective vision of both eyes, comprising two ocular portions spaced apart, one portion for each eye, which ocular portions are formed each with a lug-like extension, which extensions constitute an unobstructed glass bridge-piece which itself forms an optical continuation of the said ocular portions, which ocular portions and their extensions forming the bridge-piece constitute a single glass, substantially as described.

3. Means for assisting defective vision of both eyes, comprising two ocular portions spaced apart, one portion for each eye, which ocular portions are formed each with a lug-like extension integral one with the other and constituting an unobstructed glass bridge-piece which itself forms an optical continuation of the said ocular portions, which ocular portions and bridge piece constitute a single glass cut out of a single lens of a diameter greater than the width across both eyes, substantially as described.

4. Means for assisting defective vision of both eyes, comprising two ocular portions spaced apart, one portion for each eye, which ocular portions are formed each with a lug-like extension so shaped and juxtaposed as to constitute an unobstructed glass bridge-piece which itself forms an optical continuation of the said ocular portions and which extensions extend each to a central line that lies at right angles to the longitudinal axis of the bridge-piece and bisects the latter, the optical centre of each ocular portion and its lug-like extension being situated substantially midway between the middle of the bridge-piece and the opposite end of the ocular portion.

5. Means for assisting defective vision of both eyes, comprising two ocular portions spaced apart, one portion for each eye, which ocular portions are formed each with a lug-like extension so shaped and juxtaposed as to constitute an unobstructed glass bridge-piece which itself forms an optical continuation of the said ocular portions and which extensions extend each to a central line that lies at right angles to the longitudinal axis of the bridge-piece and bisects the latter, each ocular portion and its extension being cut out of a single lens having appropriate optical properties, which lenses are each of a diameter greater than the width across both eyes.

6. " Spectacles " comprising a single piece of glass in the form of two lens portions connected by an unobstruced glass bridge-piece, and two supports attached one to each lens portion for supporting the same in front of the eyes of a person.

7. Eye-glasses, comprising two lens portions having each a lug-like extension, which extensions are so shaped and arranged as to constitute an unobstructed glass bridge-piece and which extensions extend each to a central line that lies at right angles to the longitudinal axis of the bridge-piece and bisects the latter, and two supports attached one to each lens portion for supporting the same in front of the eyes of a person.

In testimony whereof I have signed my name to this specification in the presence of two subscribing witnesses.

ALBERT EDWARD BREDIN CRAWFORD.

Witnesses:
   ARTHUR W. LEAN,
   S. I. RODFER.